Jan. 1, 1946.  J. E. HALL  2,392,146
DRILL PIPE WIPER
Filed June 24, 1943  2 Sheets-Sheet 2

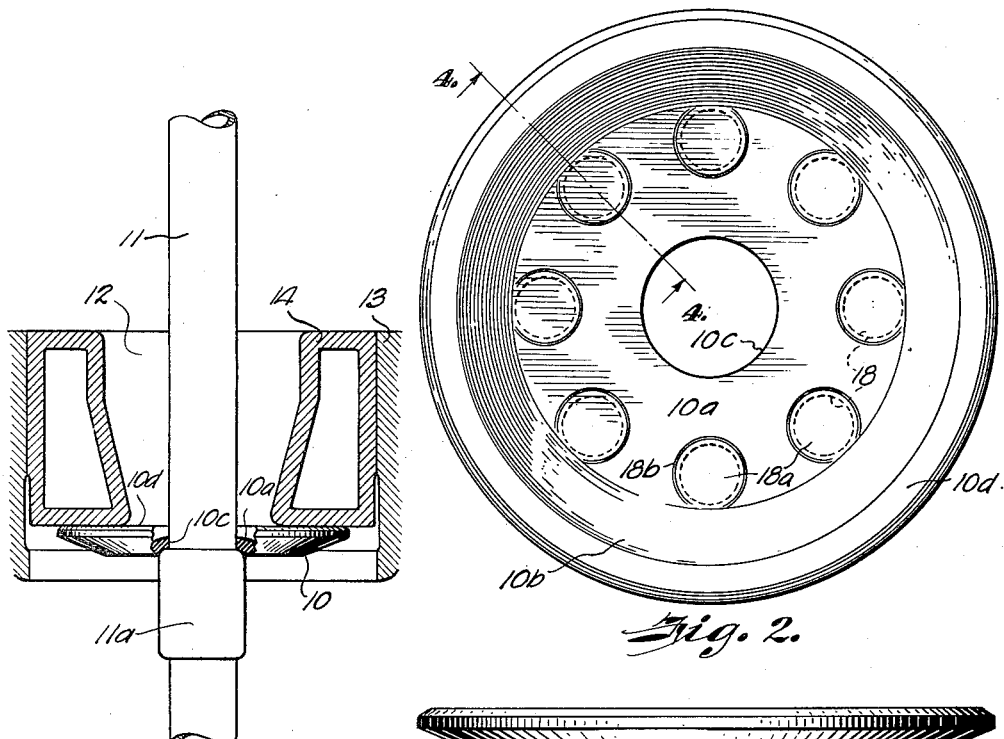
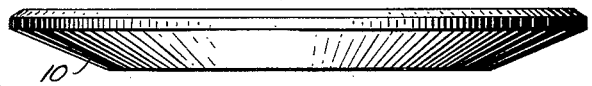
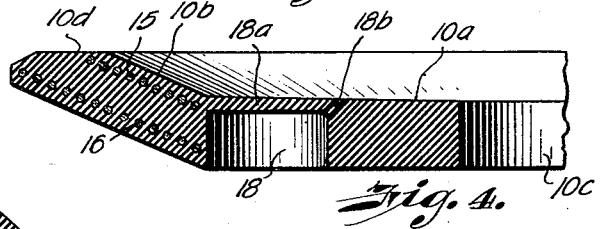
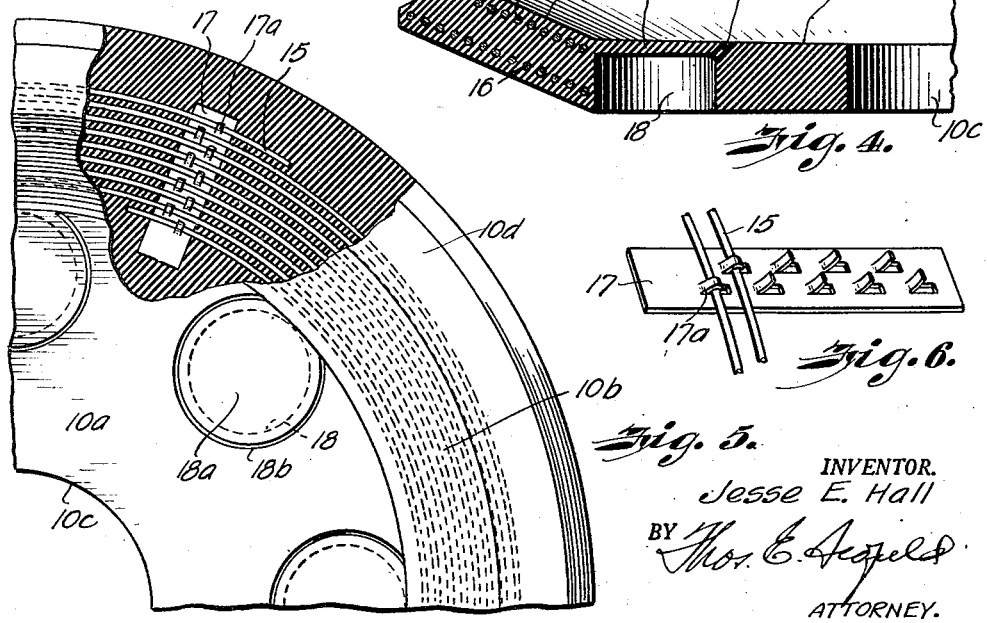

INVENTOR.
Jesse E. Hall
BY
ATTORNEY.

Patented Jan. 1, 1946

2,392,146

UNITED STATES PATENT OFFICE 2,392,146

DRILL PIPE WIPER

Jesse E. Hall, Weatherford, Tex.

Application June 24, 1943, Serial No. 492,033

8 Claims. (Cl. 15—210)

My invention relates to new and useful improvements in drill pipe wipers.

When withdrawing drill pipe from a well it is necessary to remove the well mud adhering thereto. If this is not done, the mud falls from the pipe on the workmen and on the derrick floor. The mud falling on the men is disagreeable and that falling on the derrick floor creates a dangerous situation since it is very slippery. Furthermore, the mud is expensive and considerable amounts are lost if it is not wiped from the pipes.

To avoid the above contingencies it is the usual practice to position a flexible rubber disc beneath the derrick floor around the pipe to clean the mud from the pipe as it is withdrawn from the well. The disc extends across the drill hole in the rotary table below the master bushings, and fits the pipe sufficiently tight to wipe off the mud. The disc must have a rigid peripheral portion to prevent it from being pulled through the hole in the table and a flexible central portion that will stretch and expand to permit the tool joints and drill pipe protectors to pass through. There is usually a vertical space below the master bushings in which the wiper disc can travel. Since it is large and heavy, the disc normally rides upon the drill pipe below the master bushings.

As each tool joint or protector reaches the wiper it carries the wiper upwardly against the master bushings with a terrific impact. The continuous beating or jamming of the wiper against the bushings soon causes failure of the disc if not properly designed. Portions of it may be torn or broken away and cracks or ruptures develop. In addition to the above, the tool joints and protectors as they pass the wiper stretch the flexible central portion into a cone shape while enlarging the central aperture in the disc. Swinging of the pipe string from side to side pinches and rubs the stretched rubber against the master bushings causing rapid and excessive wear and frequently causing the inner portion of the disc to split or rupture.

It is therefore desirable to provide windows in the central portion of the wiper around the central hole so that workmen can see into the well to determine the mud level or for other reasons. Previous attempts to provide windows at this location have so weakened the wiper that the central portion rapidly deteriorates.

In the past, the peripheral portion of the wiper has been reinforced with layers of fabric or with heavy metal rings clamped to or imbedded in the rubber composition. The fabric reinforcement is expensive and has never been entirely satisfactory, lacking the strength and stiffness required. When a heavy metal ring is clamped to the rubber disc it will not withstand the terrific impacts to which the wiper is subjected. The metal rings soon rupture and break away from the disc. When the heavy metal ring is embedded in the rubber composition the outer portion of the disc is too rigid and unyielding. When a tool joint or protector is pulled through the disc the rubber stretches abruptly at the inner edge of the metal reinforcement, and since the metal ring has no resiliency, the rubber soon tears along the inner edge of the ring.

An important object of my invention is to provide a drill pipe wiper having a peripheral reinforcement that will cushion the impact of the wiper against the bushings in such a way that the stresses are uniformly distributed through the disc.

Another object of my invention is to provide a drill pipe wiper that is uniquely shaped to prevent the flexible central portion thereof from being pulled into the hole in the table bushings so that it is bruised and pinched between the drill pipe and bushings.

Still another object of my invention is to provide a drill pipe wiper of the above mentioned character provided with windows shaped and distributed in the disc in such a manner that the flexible portion of the disc will be more uniformly stretched by the tool joints and protectors.

Other objects and advantages of my invention will be apparent during the course of the following description.

In the drawings forming a part of this specification and wherein like numerals are employed to designate like parts throughout the same, Fig. 1 is a side elevation of a wiper embodying my invention and showing the same in position on the pipe string and below the master bushings of the rotary table, parts of the wiper being broken away to illustrate the action which occurs when a tool joint engages the wiper, Fig. 2 is a top plan view of the wiper, Fig. 3 is an edge elevation thereof, Fig. 4 is an enlarged fragmentary sectional view taken on the line 4—4 of Fig. 2, Fig. 5 is an enlarged fragmentary plan view of the disc similar to Fig. 2, but showing parts broken away to illustrate the reinforcing wires embedded in the peripheral portion of the disc, and Fig. 6 is a perspective view of a retaining strip for the wire reinforcements.

Figure 7:
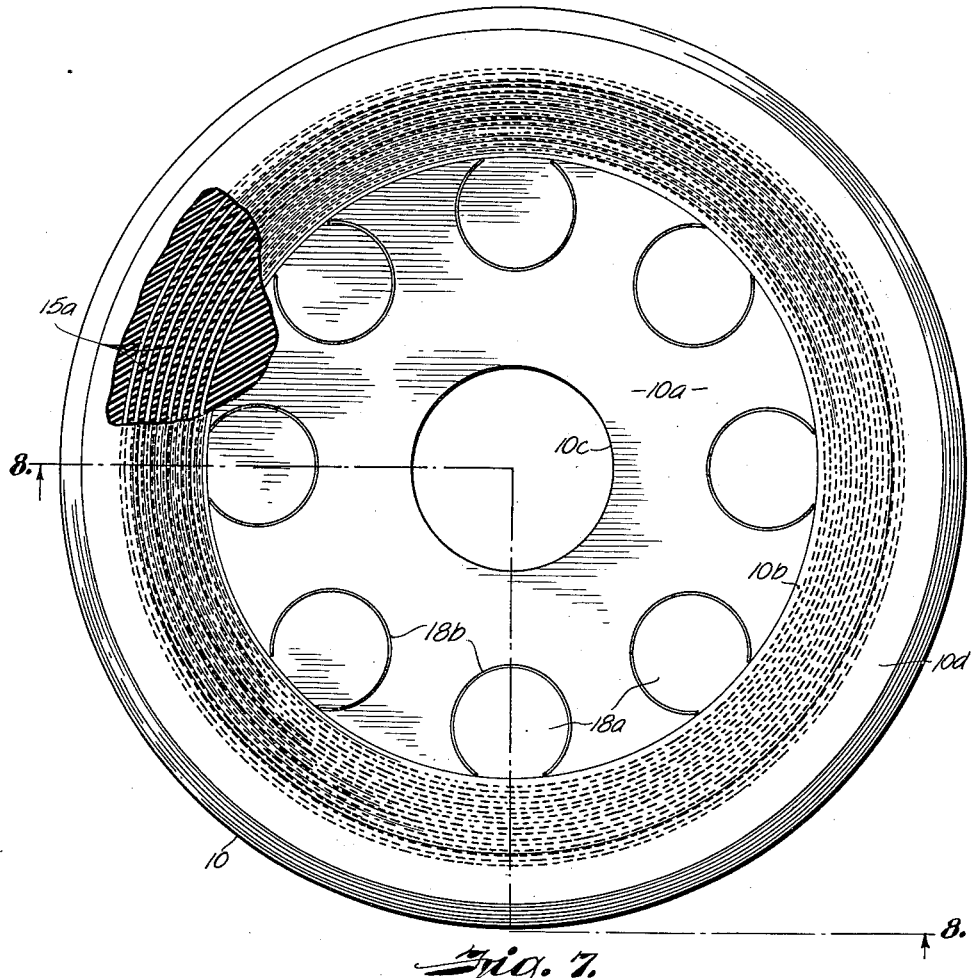
Fig. 7 is a top plan view of a modified type of wiper.

In the drawings, wherein for the purpose of illustration is shown a preferred embodiment of my invention, the numeral 10 designates a wiper disc which may be made of a rubber composition or any other suitable material. Fig. 1 best illustrates the manner in which the wiper 10 is fitted to the string of drill pipe 11 and extends across the drill hole 12 in the rotary table 13 below the master bushings 14.

Figure 8:
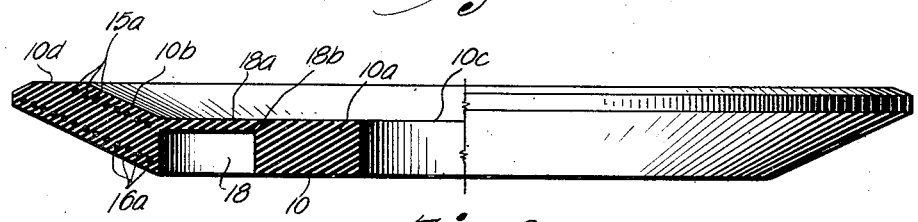
Fig. 8 is a view taken along the line 8—8 in Fig. 7 in the direction of the arrows.

The disc 10 is formed with a flat central portion 10a and an upwardly inclined integral peripheral portion 10b. The inner portion 10a has a central opening 10c through which the string of drill pipe 11 passes. The outer peripheral portion 10b is formed with a flat top surface 10d which is parallel to the top surface of the inner portion 10a. Embedded in the inclined outer portion 10b of the disc are upper and lower series of reinforcing wires 15 and 16. Each series of wire reinforcements as shown is preferably a single spirally wound length of wire; the wires, however, may consist of a plurality of concentric wire rings as shown at 15a and 16a in Figs. 7 and 8. In either event the wire loops are held in fixed relative relation during molding of the disc by fingers 17a cut and bent from retaining strips 17.

In actual practice the rubber disc is fitted on the drill pipe below the rotary table before the pipe is withdrawn from the well. The master bushings 14 are removed to permit the wiper to pass through the drill hole 12, and after placing the disc over the pipe the bushings are replaced. The central opening 10c of the disc is of slightly smaller diameter than the pipe so that a snug fit is obtained and an efficient wiping action is assured.

The weight of the wiper is sufficient to cause it to slide relatively freely upon the pipe between the joints and protectors. However, when a tool joint 11a or a drill protector (not shown) reaches the wiper, the latter is carried upwardly and against the bushings 14 as shown in Fig. 1. Since the string of drill pipe is pulled upwardly at a relatively rapid speed the rubber disc meets the bushings with a terrific impact. This impact is cushioned by the unique shape of the disc and arrangement of reinforcing wires embedded in the inclined peripheral portion of the disc. Immediately after the impact, the tool joint, due to its large diameter, pushes the flexible central portion 10a of the wiper disc upwardly. The tool joint continues to push the disc upwardly until it stretches the disc sufficiently to permit the joint to pass the central aperture. The compound stresses developed in the wiper by pressure of the disc 10 against the bushings 14 and by the upward pressure of the tool joint are evenly distributed throughout the disc and are gradually relieved or absorbed by reinforcing wires and resiliency of the peripheral portion of the disc. Stresses developed in the disc by upward movement of the flexible central portion are distributed outwardly through the peripheral portion 10b by the wires 15 and 16. As the central portion 10a begins to push upwardly the stresses are first received by the innermost loops of wire which resist further upward movement of the rubber. As the stresses become greater, the rubber around the second loops is stretched as these loops resist the stretching. Thus, the stresses are uniformly distributed and progressively and gradually relieved by reinforcing wires. The efficacy of the wires to distribute and relieve the stresses is considerably enhanced by reason of their inclined position in the outer portion of the disc. Their ability to resist the stresses is largely due to the fact that each succeeding outer ring is disposed outwardly and above the preceding ring. The shock caused by impact of the flat upper surface 10d against the bushings 14 is also relieved in the same manner.

It is frequently desirable or necessary for workmen to see into the well through the drill hole 12. This can only be done by providing windows in the wiper. The windows here shown comprise a plurality of sockets or formed depressions 18 in the bottom of the disc. The sockets 18 are equally spaced and concentrically disposed about the drill pipe opening 10c. As best shown in Fig. 4 the sockets do not extend entirely through the disc so that a thin flap or cover 18a is provided for each window. The flaps 18a may either be integral with the disc throughout their circumference or they may be separated from the disc for a portion of their circumference by an arcuate slot 18b. If desired, the flaps 18a can be entirely cut away.

When the drill pipe 11 is centrally positioned in the drill hole as shown in Fig. 1, all of the windows 18 are under the master bushings 14. However, if the string of drill pipe is pushed to one side against the bushings a number of the windows are exposed and these permit ample vision into the well.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. A drill pipe wiper comprising a disc of rubber composition formed with a relatively flexible flat central portion and an integral inclined peripheral portion, the central portion of the disc having an opening therein and said peripheral portion being made relatively inflexible by rows of reinforcing wire embedded therein.

2. A drill pipe wiper comprising a disc of rubber composition having a relatively flexible flat central portion formed integrally with a relatively inflexible or rigid inclined peripheral portion, said central portion of the disc having a central opening for the drill pipe and a plurality of windows arranged concentrically around the central opening.

3. A drill pipe wiper comprising a disc of rubber composition having a relatively flexible flat central portion formed integrally with an inclined peripheral portion, said central portion formed with a pipe receiving opening and a plurality of spaced windows arranged concentrically around the pipe receiving opening, each of said windows having a closure flap, and reinforcing wire embedded in the inclined peripheral portion of the disc to make the same relatively rigid.

4. A drill pipe wiper comprising a disc of rubber composition having a relatively flexible flat central portion formed integrally with an inclined peripheral portion, said central portion formed with a pipe receiving opening and a plurality of spaced windows having their centers arranged on a circle which is concentric with the pipe receiving opening, and reinforcing wire embedded in the inclined peripheral portion of the disc to make the same relatively rigid.

5. A drill pipe wiper comprising a reinforced disc of rubber composition having a relatively flexible flat central wiper portion formed integrally with an inclined rigid peripheral portion, a pipe receiving opening centrally positioned in the wiper portion, substantially circular loops of reinforcing wire of different diameters circumferentially surrounding the central wiper portion and embedded in the inclined peripheral portion.

6. A drill pipe wiper comprising a reinforced disc of rubber composition having a relatively flat flexible central wiper portion formed integrally with an inclined peripheral portion, a plurality of rows of substantially circular loops of reinforcing wire of different diameters circumferentially surrounding the central wiper portion and embedded in the inclined peripheral portion.

7. A drill pipe wiper comprising a reinforced disc of rubber composition with a flat flexible central wiper portion formed integrally with a peripheral rigid portion, said wiper portion having a central pipe receiving opening for the passage of the drill pipe, substantially circular loops of reinforcing wire of different diameters circumferentially surrounding the wiper portion and embedded in the peripheral portion and retaining strips engaging the wire loops and embedded with the wire in the peripheral portion adapted to hold the wire loops in fixed relative relationship.

8. A drill pipe wiper comprising a reinforced disc of rubber composition with a relatively flexible flat central wiper portion formed integrally with an inclined rigid peripheral portion, a pipe receiving opening in the wiper portion for the passage of the drill pipe, circular loops of reinforcing wire of different diameters circumferentially surrounding the wiper portion and embedded in the peripheral portion, retaining strips engaging the wire loops and embedded with the reinforcing wire in the peripheral portion and adapted to maintain the wire loops in fixed relative relationship.

JESSE E. HALL.